INVENTOR.
Arthur F. Grant
BY
Frease, Bishop, Johns & Schick
ATTORNEYS

May 23, 1967  A. F. GRANT  3,320,828
SPEED REDUCER OR INCREASER
Filed July 14, 1964  4 Sheets-Sheet 2

INVENTOR.
Arthur F. Grant
BY
Fraase, Bishop, Johns & Schick
ATTORNEYS

May 23, 1967  A. F. GRANT  3,320,828
SPEED REDUCER OR INCREASER
Filed July 14, 1964  4 Sheets-Sheet 3

INVENTOR.
Arthur F. Grant
BY
Fraase, Bishop, Johns & Schick
ATTORNEYS

May 23, 1967    A. F. GRANT    3,320,828
SPEED REDUCER OR INCREASER
Filed July 14, 1964    4 Sheets-Sheet 4

INVENTOR.
Arthur F. Grant
BY
Frease, Bishop, Johns & Schick
ATTORNEYS

United States Patent Office 3,320,828
Patented May 23, 1967

3,320,828
SPEED REDUCER OR INCREASER
Arthur F. Grant, Shaker Heights, Ohio, assignor to Allied Machine & Engineering Corporation, Cleveland, Ohio, a corporation of Ohio
Filed July 14, 1964, Ser. No. 382,543
5 Claims. (Cl. 74—675)

The invention relates to speed reducers or increasers and more particularly to a high ratio speed reducer and torque multiplier through which high speed, low torque input is transposed to low speed, high torque output.

A type of high speed, low torque hydraulic motor now in use works on the principle of a pinion gear on the output shaft being rolled, by cam or eccentric means, within a ring gear.

One manufacturer makes such hydraulic motors under the trademark "Gerotor". In this particular type of hydraulic motor each of the gears has relatively few, comparatively large teeth, the ring gear usually having only one or two more teeth than the pinion gear.

Other hydraulic motors of this gear-within-gear type have gears with more or less conventional teeth, the ring gear having several more teeth than the pinion gear.

The object of the present invention is to utilize the gear-within-gear principle for a speed reducer and torque multiplier, or speed increaser and torque decreaser.

Another object of the invention is to provide a speed reducer and torque multiplier utilizing the gear-within-gear principle, in which one of the gears is moved eccentrically in an orbit by means operated by the input shaft, the other gear being mounted upon the output shaft and being rotated by the orbiting of the first-named gear.

A further object of the invention is to provide a speed reducer and torque multiplier of the character referred to, in which the gear which is moved eccentrically in an orbit may be permitted to free wheel when desired.

Still another object of the invention is to provide such a device in which either of the two gears may be moved eccentrically in an arbit by means operated by the input shaft, and the other gear may be mounted upon the output shaft.

It is another object of the invention to provide a speed reducer and torque multiplier in which a ring gear is moved eccentrically in an orbit by means operated by the input shaft, a pinion gear upon the output shaft being rotated by the ring gear.

A further object of the invention is to provide a speed reducer and torque multiplier of the character referred to, in which the ring gear may be permitted to free wheel when desired.

A still further object of the invention is to provide a speed reducer and torque multiplier having high ratio capabilities but compact in size and low in cost.

Another object of the invention is to provide such a speed reducer using dual ring gear 180° out-of-phase to counteract or compensate for excessive pinion shaft bearing loads imposed by single ring gear drive.

Still another object of the invention is to provide a device of the character referred to using orbiting dual pinion gears 180° out-of-phase.

A further object of the invention is to provide a speed increaser by operating gear-within-gear devices of the character referred to in reverse, that is by applying the driving power to the shaft of the pinion gear.

A still further object of the invention is to provide a speed increaser by forming such a gear-within-gear device in which the pitch diameter of the pinion gear is less than half that of the ring gear.

The above and other objects, apparent from the drawings and following description, may be attained, the above described difficulties overcome and the advantages and results obtained, by the apparatus, construction, arrangements and combinations, subcombinations and parts which comprise the present invention, preferred embodiments of which, illustrative of the best mode in which applicant has contemplated applying the principle, being set forth in detail in the following description and illustrated in the accompanying drawings.

In general terms, the invention may be described as comprising an input shaft adapted to be rotated at high speed and low torque. Eccentric means such as a ring, crank or cam, is operatively connected to the input shaft and drives an outer or ring gear, thus providing the input torque and speed to the gear system.

Means is provided for preventing the ring gear from turning on its axis while still permitting its eccentric motion. The simplest form of such means is disclosed herein as consisting of a pin secured to the face of the outer or ring gear near its circumference, and free to move in an enlarged opening or radial slot in the stationary housing to provide a clearance for the eccentric motion of the ring gear while preventing it from turning on its axis. It, therefore, provides the torque reaction for the gear system and enables torque multiplication to occur in the output member.

A more complicated but preferred means of preventing rotation of the ring gear is also disclosed herein as consisting of a multiplicity of pins (four or more equally spaced circumferentially) secured to the face of the ring gear and free to move in enlarged holes or sockets in the stationary housing, or in a braking disc, so as to permit eccentric motion of the ring gear but preventing it from turning on its axis.

The output shaft is journalled on a fixed axis, aligned with the axis of the input shaft, and an inner or pinion gear is fixed thereon. The pinion gear has one or more teeth less than the ring gear, and meshes with the ring gear.

In operation, the ring gear is forced to roll around the inner or pinion gear and due to the fact that the ring gear is prevented from turning on its axis, the inner gear and with it the output shaft, is rotated part of a revolution in proportion to the difference in the number of teeth between the inner and outer gears, and in a direction opposite to the direction of rotation of the input shaft.

In another, and in some instances preferred embodiment of the invention, eccentric means upon the input shaft drives an inner or pinion gear which is prevented from turning on its axis while still permitting its eccentric motion.

The output shaft is journalled on a fixed axis, aligned with the axis of the input shaft, and means is provided connecting it to a ring gear having one, or a few, teeth more than the pinion gear, and meshing with the pinion gear.

In the operation of this embodiment of the invention, the pinion gear is forced to orbit around within the ring gear, and due to the fact that pinion gear is prevented from turning on its axis, the ring gear, and with it the output shaft, is rotated in the same direction as the input shaft.

Figure 1:
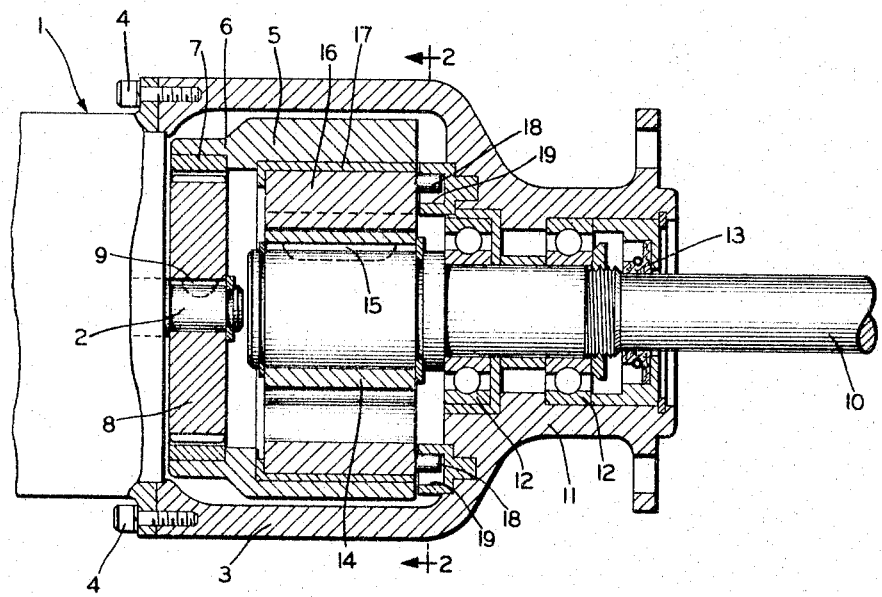
FIG. 1 is a longitudinal sectional view through a gear reduction embodying the invention using "Gerotor" type gears.
Figure 2:
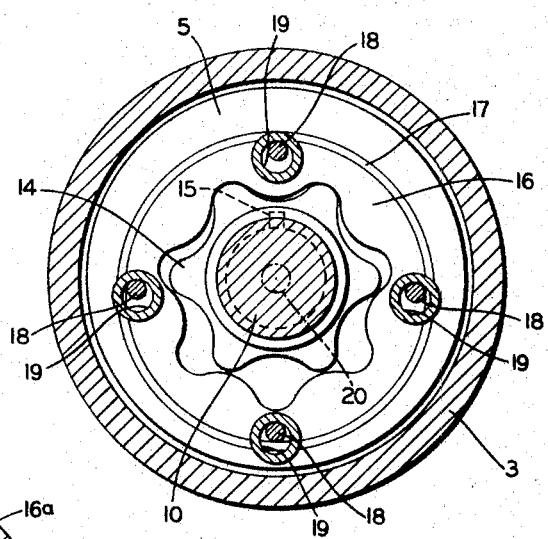
FIG. 2 is a transverse section on the line 2—2, FIG. 1.

Referring now more particularly to the embodiment of the invention illustrated in FIGS. 1 and 2, a source of motive power is indicated generally at 1, which may be either a hydraulic or electric motor, or other prime mover having a drive shaft 2, which is the input shaft for the speed reducer.

A housing 3, of any conventional form, encloses the speed reducer, and for the purpose of illustration, is shown attached to the housing of the motor 1 as by cap screws 4 or the like. An eccentric ring 5 is adapted to be rotated by the input shaft 2. This eccentric ring may be connected rigidly to the shaft 2, but, in order to compensate for any misalignment between the input shaft and the output shaft, a connection in the form of a universal joint is provided.

For this purpose, an extension 6 is formed on the end of the eccentric ring toward the input shaft, and a ring gear 7 is formed or fixed therein and meshes directly throughout its surface with a pinion gear 8 fixed upon the input shaft 2 as by the key 9.

The output shaft 10 is journalled within the reduced portion 11 of the housing 3, any suitable bearings being provided therefor. For the purpose of illustration, ball bearings 12 are shown for mounting the input shaft within the housing. A conventional oil seal 13 may be provided at the outer end of the housing.

An inner or pinion gear 14 is fixed upon the output shaft 10, as by the key 15, and a ring gear 16 is journalled within the eccentric ring 5, a bushing 17, or other suitable bearing, being interposed therebetween. In the "Gerotor" type of speed reducer and torque multiplier shown in FIGS. 1 and 2, the inner or pinion gear 14 has one less tooth than the outer or ring gear 16.

The eccentricity of the eccentric ring 5 is determined by the difference in pitch diameter of the inner and outer gears 14 and 16, respectively. Means is provided for preventing the outer or ring gear 16 from turning on its axis while still permitting its eccentric motion caused by the eccentric ring 5.

This means is shown in FIGS. 1 and 2 as comprising a pin 18 fixed upon the outer side of the ring gear 16 near its circumference, and free to move within an enlarged socket 19 formed in, or mounted upon, the opposing side of the stationary housing 3, to provide clearance for the eccentric motion. Four or more of these assemblies are located circumferentially and equally spaced to provide maximum torque reaction capacity with minimum localized stress.

As the eccentric ring 6 is rotated by the input shaft 2, the outer or ring gear 16 will be held from turning on its axis but permitted to move eccentrically. The broken line circle, indicated at 20 in FIG. 2, shows the orbit in which the center of the outer or ring gear 16 travels.

The "Gerotor," or gear-within-gear, type of speed reducer utilizes the "hunting tooth" principle. By mounting the inner gear 14 on a fixed center, the eccentric ring 5 forces the outer gear 16 to roll around the inner gear 14. Because the outer gear 16 is prevented from turning on its axis, by means such as the pin 18 and socket 19, while still permitting the eccentric rotation, rotation of the inner gear 14 is thus produced.

For each cycle of oscillation of the outer or ring gear 16, the inner or pinion gear 14 is forced to advance part of a revolution in proportion to the difference in the number of teeth between the inner and outer gears. As there is one more tooth on the outer or ring gear 16 than on the inner or pinion gear 14, the output shaft 10 will advance the distance of one tooth for each oscillation of the ring gear.

The input shaft 2 is driven at high speed and low torque, driving the eccentric ring 5 which provides the input torque and speed to the gear system. The inner gear 14 rotates on a fixed axis in alignment with the axis of the input shaft 2, and rotation thereof produces the output torque and speed. The output shaft 10 is thus driven at low speed and high torque.

Figure 3:
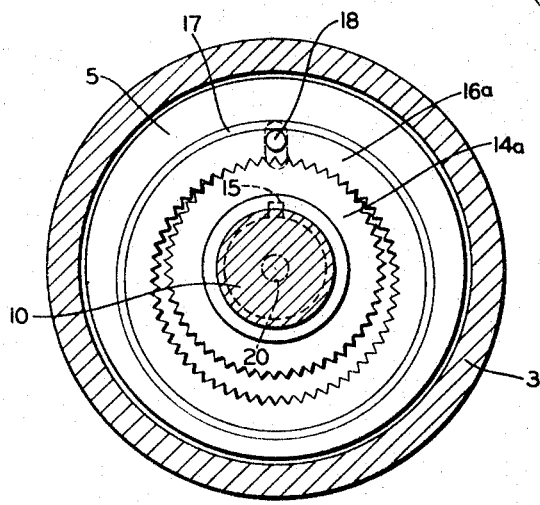
FIG. 3 is a view similar to FIG. 2, employing conventional type gears, splines, or serrations for high ratios.

In FIG. 3 is shown a modification of the invention which may be the same as illustrated and described in FIGS. 1 and 2, excepting that the outer gear 16a and inner gear 14a are conventional type ring and pinion gears, splines or serrations, respectively, rather than the "Gerotor" type of gears shown in FIGS. 1 and 2. Instead of the outer gear having only one tooth more than the inner gear, as in FIGS. 1 and 2, the outer gear 16a is shown as having six more teeth than the inner gear 14a.

All other parts of the device shown in FIG. 3 may be the same as in FIGS. 1 and 2 and the same reference numerals are applied thereto. The operation would be the same as described with reference to FIGS. 1 and 2 excepting that the output shaft will advance the difference of six teeth for each oscillation of the ring gear 16a.

Figure 4:
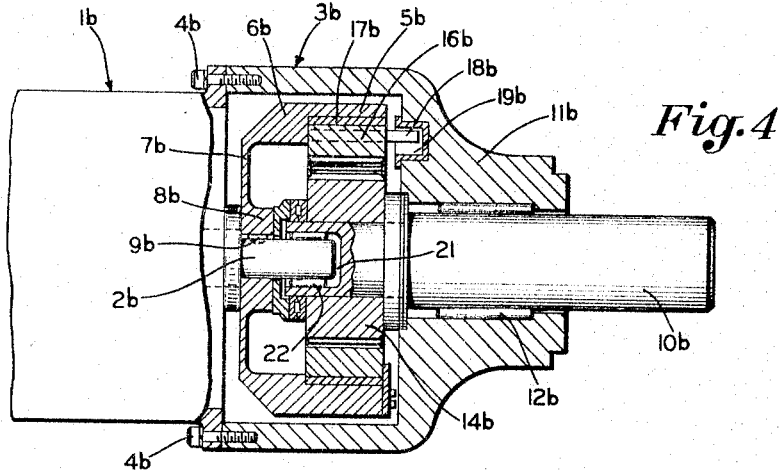
FIG. 4 is a longitudinal sectional view through a modified form of gear reduction in which the input shaft is journalled within a socket in the output shaft.

In FIG. 4 is shown another embodiment of the invention in which the driving means 1b may be a hydraulic or electric motor, or other prime mover, having drive shaft 2b which is the input shaft of the speed reducer.

A housing, indicated generally at 3b, is provided for the speed reducer mechanism and may be attached to the housing of the motor means 1b as by cap screws 4b. The eccentric ring 5b is shown provided with an extension 6b at one end thereof, connected by a flexible web or spokes 7b to a hub 8b fixed upon the input shaft 2b, as by the key 9b.

A ring gear 16b is journalled within the eccentric ring 5b, as by the bushing 17b, or its equivalent. The housing 3b has a reduced portion 11b within which is journalled the output shaft 10b by any suitable bearing means, as indicated at 12b.

A socket 21 is formed in the inner end of the output shaft 10b and the adjacent end of the input shaft 2b is journalled therein by any suitable bearing means, as indicated at 22. A pin 18b, upon the ring gear 16b, is received in an elongated socket 19b in the stationary housing.

An inner or pinion gear 14b is fixed upon the output shaft 10b and engages the ring gear in the manner illustrated and described above. The gears 14b and 16b may be conventional type gears, as shown in FIG. 3, or "Gerotor" type gears, as shown in FIGS. 1 and 2. The operation of this embodiment of the speed reducer will be obvious from the above description.

Figure 5:
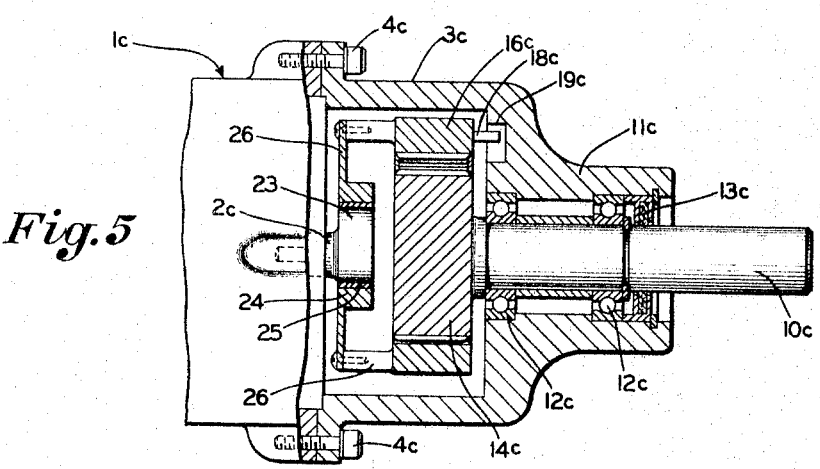
FIG. 5 is a view similar to FIG. 4 showing another modification in which an eccentric cam is fixed upon the output shaft and rotates within a ring attached to the ring gear.

In FIG. 5 is shown another modification of the invention, in which the drive means is indicated at 1c, with a drive shaft 2c which is the input shaft for the speed reducer. An eccentric cam 23 is formed upon the inner end of the input shaft 2c and rotates within the eccentric ring 24, a bushing 25 or the like being interposed therebetween. The eccentric ring 24 is connected by flexible spokes 26, or the like, to the outer or ring gear 16c.

A pin 18c, upon the ring gear 16c, engages in an elongated socket 19c in the stationary housing 3c. The housing 3c is shown connected to the housing of the motive means 1c as by cap screws 4c. The output shaft 10c is journalled within the reduced portion 11c of the housing by any suitable bearing means, such as the ball bearings 12c. A suitable seal 13c is shown provided at the outer end of the housing.

The inner or pinion gear 14c is fixed upon the inner end of the output shaft 10c and engages the ring gear 16c in the manner above described. The gears 14c and 16c may be either "Gerotor" type gears as shown in FIGS. 1 and 2, or conventional type gears as shown in FIG. 3. The operation of the embodiment of FIG. 5 will be obvious from the above.

Figure 6:
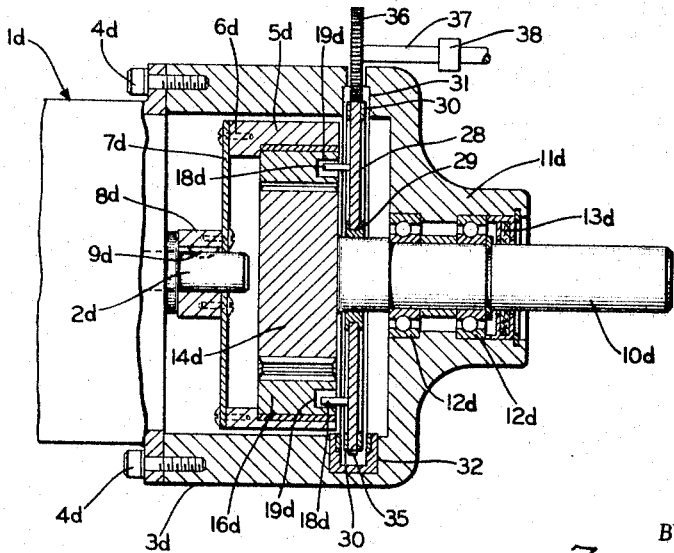
FIG. 6 is a longitudinal sectional view of another modification of the invention.

In FIG. 6 is shown a modification of the invention applicable to certain uses where free wheeling may be desirable. In this embodiment the motive means is indicated at 1d and the input shaft at 2d. The housing 3d of the speed reducer is shown attached to the housing of the motor as by cap screws 4d.

The eccentric ring 5d may be of any of the types above illustrated and described in detail. For the purpose of illustration, this eccentric ring is shown provided with an extension 6d at one end, connected by flexible spokes or web 7d to the hub 8d, keyed upon the input shaft 2d, as indicated at 9d.

The ring gear 16d is journalled within the eccentric ring 5d and is provided with two or more sockets 19d, each of which receives a pin 18d carried by the rotatable disc 28 having anti-friction bearing 29 surrounding the output shaft 10d. Friction material 30 is attached to each side of the rotatable disc 28, near the periphery thereof.

The peripheral portion of the disc 28 is freely rotatable within the annular recess 31 in the housing, and any suitable sort of a braking clamp means for clamping the friction rings 30 is diagrammatically indicated at 32. The output shaft 10d is journalled within the reduced portion 11b of the housing, as by the ball bearings 12d, or the like, and a seal 13d is shown at the outer end of the housing.

The inner or pinion gear 14d is fixed to the output shaft 10d and engages the ring gear in the manner above shown and described. Both the pinion gear 14d and ring gear 16d may be of conventional type as shown in FIG. 3, or of "Gerotor" type as shown in FIGS. 1 and 2.

With the braking clamp 32 in the released or unclamped position, as shown in FIG. 6, the speed reducer will not transmit torque but will "free wheel" by the rolling or rotation of the ring gear around the stationary inner pinion gear. By applying the braking clamp 32 to hold the disc 28 against rotation, the ring gear 16d can no longer rotate but will merely orbit in the manner above described, so that the unit will transmit torque. Such a device could be used in tandem or parallel to produce autocontrol transmissions.

By applying the braking clamp 32 under controlled conditions, the rotation of the disc 28 can be controlled from zero to free wheeling so that the developed torque of the output shaft can be similarly controlled from full torque to zero.

For the purpose of providing controlled torque, speed and direction of rotation of the output shaft, and vise versa, the braking disc 28 may be rotated by independent power means. For illustration, gear teeth 35 may be provided around the periphery of the disc 28, and a pinion gear 36, upon an independent drive shaft 37 meshes therewith.

The braking disc 28 may thus be rotated in either direction, at any speed, by corresponding rotation of the drive shaft 37. The differential speed and direction of rotation between the independent drive shaft 37 and the input shaft 2d will determine the speed and direction of rotation of the output shaft 10d.

A disconnect clutch 38 may be provided on the shaft 37 to disconnect the drive pinion 36 from the independent power means when it is desired to permit the braking disc 28 to free wheel.

Figure 7:
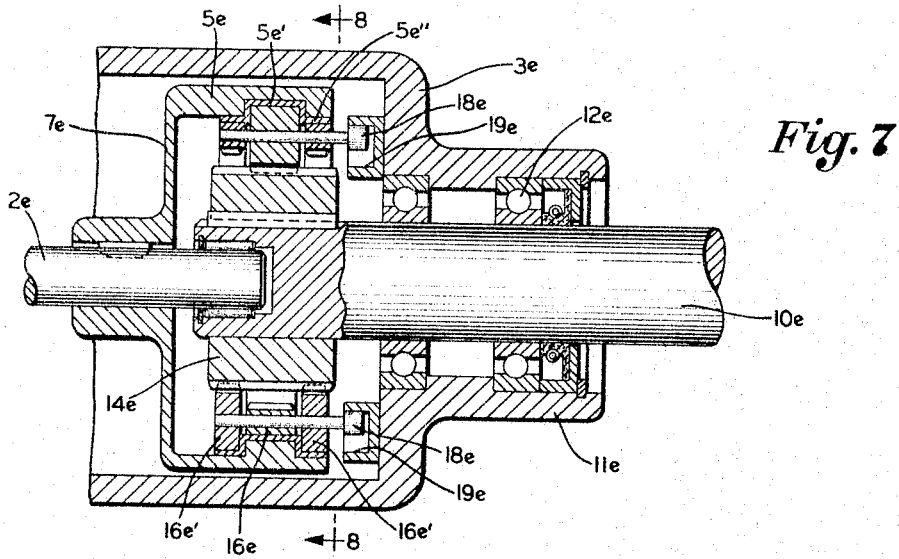
FIG. 7 is a longitudinal sectional view of another embodiment of the invention employing dual ring gears 180° out-of-phase to compensate for excessive pinion bearing loads.
Figure 8:
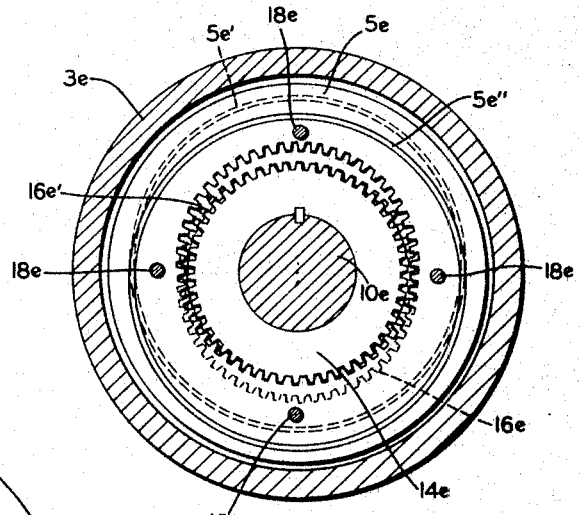
FIG. 8 is a transverse section of the device shown in FIG. 7, taken on the line 8—8, FIG. 7.

In FIGS. 7 and 8 is shown another modification of the invention in which dual ring gears, 180° out-of-phase, are provided to compensate for excessive pinion shaft bearing loads, such as are imposed by a single ring gear drive.

The housing is indicated at 3e. The input shaft 2e is arranged to rotate the eccentric ring 5e by any suitable means such as the flexible web or the like 7e. The eccentric ring 5e has three eccentric surfaces, the central surface 5e' and the two outer surfaces 5e'', 180° out-of-phase therewith.

There is a central, relatively wide, ring gear 16e and two outer ring gears 16e' of half the width or thickness of the central gear, one being located upon each side of the central gear and both of the ring gears 16e' being located 180° out-of-phase to the central ring gear 16e.

The central ring gear 16e engages the central eccentric surface 5e' and the two outer ring gears 16e' engage the two outer eccentric surfaces 5e'', the three ring gears being connected together in this manner as by the pin 18e, four or more of which are equally spaced circumferentially around the ring gears.

The extremities of the pins 18e are located in the enlarged sockets or holes 19e formed in or located upon the stationary housing. The output shaft 10e is journalled in any suitable bearings, as indicated at 12e in the reduced portion 11e of the stationary housing and has a pinion gear 14e thereon meshing with the ring gears 16e and 16e', as shown.

Although the invention has been described as a speed reducer and torque multiplier, it should be understood that any of the devices described above may be used as speed increasers by operating them in reverse. That is to say, considering for example the embodiment of FIG. 1, if power is applied to the shaft 10 so that the shaft 2 becomes the output shaft, the device will then operate as a speed increaser rather than as a speed reducer.

Figure 9:
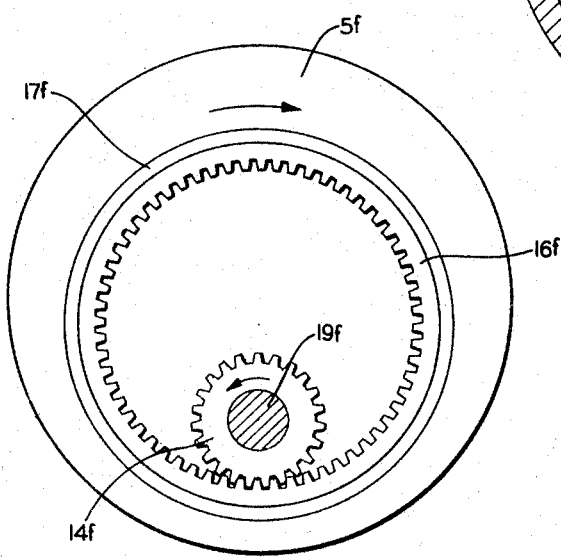
FIG. 9 is a transverse section of a speed increaser in which the pitch diameter of the pinion gear is less than half that of the ring gear.

In the embodiment of the invention illustrated in FIG. 9, a speed increaser is shown in which the eccentric ring 5f is operatively connected to the input shaft (not shown) so as to be rotated thereby.

The ring gear 16f is journalled within the eccentric gear as by any suitable bushing or bearing 17f. The pinion gear 14f has a pitch diameter less than half that of the ring gear. The pinion gear is fixed upon the output shaft 19f in the manner shown in the other embodiments of the invention and the construction and operation is otherwise the same as above described, except that the output shaft is driven at high speed and low torque.

The smaller the diameter of the pinion gear is made, the greater the increase of speed of the output shaft. If the pinion gear is just one-half the pitch diameter of the ring gear, the device will produce a 1-1 ratio, and as above described, as the diameter of the pinion gear is increased above one-half, the device becomes a speed reducer.

In the above described embodiments of the invention the ring gear is orbited around a pinion gear by eccentric means on the input shaft, the pinion gear being fixed on the output shaft and rotated oppositely to the input shaft.

Figure 10:
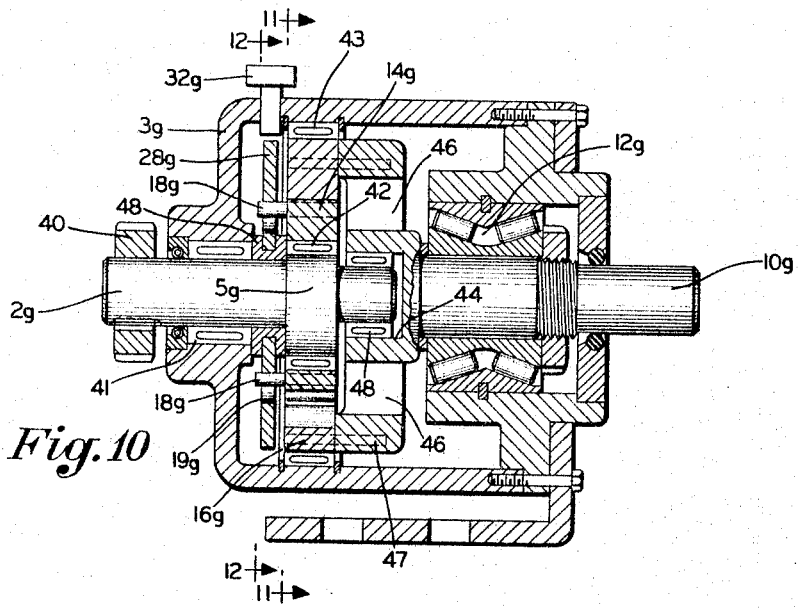
FIG. 10 is a longitudinal sectional view through an embodiment of the invention in which a pinion gear is caused to orbit within a ring gear by eccentric means on the input shaft.
Figure 12:
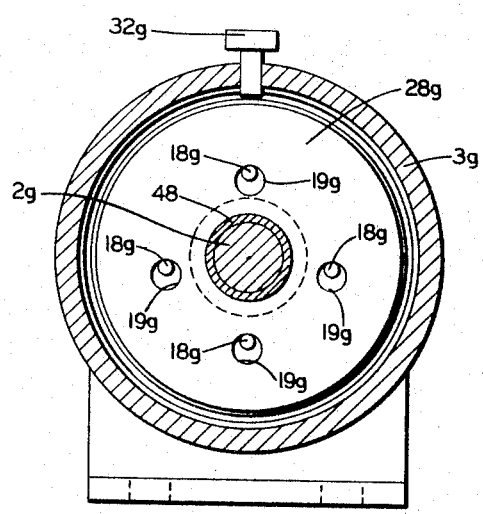
FIG. 12 is a transverse section on the line 12—12, FIG. 10.
Figure 11:
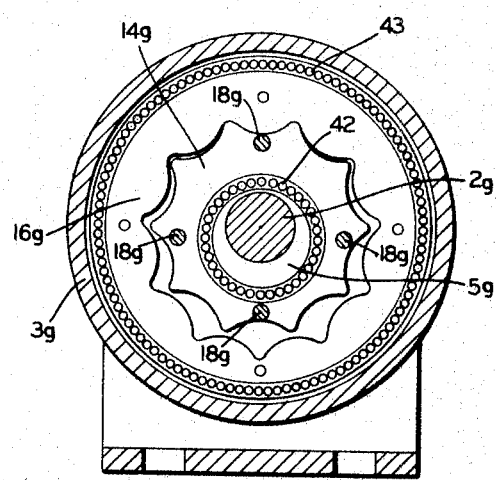
FIG. 11 is a transverse section on the line 11—11, FIG. 10.

In the embodiment of the invention disclosed in FIGS. 10 to 12, a ring gear is fixed to the output shaft and a pinion gear is orbited therein by eccentric means upon the input shaft, causing the output shaft to be rotated at lower speed and higher torque, in the same direction as the input shaft. In many instances this may be a preferred form of the invention.

Referring now in detail to the embodiment of the invention illustrated in FIGS. 10 to 12, the input shaft 2g may be rotated at high speed and low torque by any conventional means. For the purpose of illustration, a pinion 40 is shown keyed or otherwise fixed upon the output shaft for connection thereto of any conventional power means.

The input shaft 2g is shown journalled within the housing 3g, as by a bearing 41, and has formed thereon, within the housing, an eccentric crankshaft or cam 5g. A pinion gear 14g, of the "Gerotor" type, is journalled upon the eccentric 5g, as by a bearing 42.

A ring gear 16g, having one more tooth than the pinion gear 14g, is journalled within the housing 3g, as by the bearing 43. The output shaft 10g is journalled within the housing, as by the roller bearing 12g, and is shown as provided with a socket 44 in its inner end, within which the inner end of the input shaft is journalled, as by a bearing 48. The inner end of the output shaft is shown connected, as by the spokes 46 and rim 47, to the ring gear 16g.

The pinion gear 14g is provided with four or more pins 18g, equally spaced around its face and received within enlarged apertures or sockets 19g in the braking or connecting disc 28g, which is journalled upon the input shaft, as by the bearing 48. A brake 32g is adapted to be applied to the periphery of the disc 28g, to hold the same against rotation.

In the operation of this embodiment of the invention, when the input shaft is rotated, unless the brake 32g is applied to the disc 28g, the device will not transmit torque, but will free wheel by the rolling or rotation of the pinion gear 14g within the ring gear 16g.

By applying the brake 32g to the disc 28g, to hold the disc against rotation, the pinion gear 14g can no longer rotate, but will merely orbit within the ring gear, without turning upon its axis. For each cycle of oscillation of the pinion gear 14g, the ring gear 16g, and with it the output shaft 10g, is forced to advance part of a revolution and in the same direction as the direction of rotation of the input shaft 2g. Thus the speed of the output shaft will be reduced and the torque increased, as compared with the input shaft.

It should be understood that the particular construction illustrated in FIGS. 10, 11 and 12 is for the purpose of illustration only, and that any of the modifications and details of construction illustrated in FIGS. 1 to 9 and above described, may be applied to this embodiment of the invention in the same manner as above described in detail.

From the above it will be seen that the rotating and cycling elements of the device are counter-balanced so that induced vibration is eliminated. Also, it is obvious that torque translation or reaction is accomplished at the high speed, low torque input to the gear-reduction system, rather than in the high torque output, thus contributing to improved operating efficiency and lower stressed parts resulting in longer life expectancy.

It will further be seen that the high torque output gearing has relatively low rotational speed, contributing to long life expectancy of the device. It will also be seen that there is high relative efficiency, due to favorable load distribution.

In the foregoing description, certain terms have been used for brevity, clearness and understanding, but no unnecessary limitations are to be implied therefrom beyond the requirements of the prior art, because such words are used for descriptive purposes herein and are intended to be broadly construed.

Moreover, the embodiments of the improved construction illustrated and described herein are by way of example, and the scope of the present invention is not limited to the exact details of construction.

Having now described the invention or discovery, the construction, the operation, and the use of preferred embodiments thereof, and the advantageous new and useful results obtained thereby; the new and useful construction, and reasonable mechanical equivalents thereof obvious to those skilled in the art, are set forth in the appended claims.

I claim:

1. A speed reducer comprising an input shaft, an output shaft journalled in alignment with the input shaft, a pinion gear fixed upon the output shaft, a ring gear meshing with the pinion gear, said ring gear having a greater number of teeth than the pinion gear, means operatively connected to the input shaft for moving the ring gear eccentrically, a rotatable braking means, pin and socket means between the ring gear and said braking means permitting free rotation of the ring gear, and brake means for holding said rotatable braking means against rotation for preventing the ring gear from turning on its axis while permitting its eccentric motion, whereby high speed, low torque rotation of the input shaft results in low speed, high torque rotation of the output shaft.

2. A speed reducer comprising an input shaft, an output shaft journalled in alignment with the input shaft, a pinion gear fixed upon the output shaft, a ring gear meshing with the pinion gear, said ring gear having a greater number of teeth than the pinion gear, an eccentric ring operatively connected to the input shaft and journalled around the ring gear for moving the ring gear eccentrically, a rotatable braking means, pin and socket means between the ring gear and said rotatable braking means permitting free rotation of the ring gear, and brake means for holding said rotatable braking means against rotation for preventing the ring gear from turning on its axis while permitting its eccentric motion, whereby high speed, low torque rotation of the input shaft results in low speed, high torque rotation of the output shaft.

3. A speed reducer comprising an input shaft, an output shaft journalled in alignment with the input shaft, a ring gear, a pinion gear within and meshing with the ring gear, said ring gear having a greater number of teeth than the pinion gear, one of said gears being fixed upon the output shaft, means operatively connected to the input shaft for moving the other gear eccentrically, a rotatable braking means, pin and socket means between said other gear and said rotatable braking means, and brake means for holding said rotatable braking means against rotation for preventing said other gear from turning on its axis while permitting its eccentric motion, whereby high speed, low torque rotation of the input shaft results in low speed high torque rotation of the output shaft.

4. A speed reducer as defined in claim 1, in which the brake means may also control torque reaction of the braking means for controlling the turning of the ring gear on its axis, thus controlling the high torque rotation of the output shaft between zero and full speed.

5. A speed reducer as defined in claim 1, in which the braking means is operated by an independent power means, the differential action of which, operated in conjunction with the input shaft provides controlled torque, speed and direction of rotation of the output shaft and vice versa.

References Cited by the Examiner

UNITED STATES PATENTS

| | | | |
|---|---|---|---|
| 2,092,375 | 9/1937 | Johnson | 74—785 |
| 2,382,482 | 8/1945 | Henry | 74—804 |
| 2,402,547 | 6/1946 | Gilfillan | 74—785 |
| 2,420,552 | 5/1947 | Morrill | 74—785 |
| 2,481,627 | 9/1949 | Sharpe | 74—804 |
| 2,849,897 | 9/1958 | Walma | 74—804 |
| 2,861,481 | 11/1958 | Sundt | 74—804 X |
| 2,884,815 | 5/1959 | Pittman | 74—804 |
| 3,077,125 | 2/1963 | Louton et al. | 74—804 |

DAVID J. WILLIAMOWSKY, *Primary Examiner.*

C. J. HUSAR, *Assistant Examiner.*